(12) United States Patent
Hotta et al.

(10) Patent No.: US 8,179,770 B2
(45) Date of Patent: May 15, 2012

(54) OPTICAL PICKUP APPARATUS

(75) Inventors: Tohru Hotta, Nagano (JP); Kenichirou Kawabuchi, Kanagawa (JP); Ryoichi Kawasaki, Gunma (JP)

(73) Assignees: Sanyo Electric Co., Ltd., Osaka (JP); Sanyo Optec Design Co., Ltd., Tokyo (JP)

(*) Notice: Subject to any disclaimer, the term of this patent is extended or adjusted under 35 U.S.C. 154(b) by 197 days.

(21) Appl. No.: 12/209,742

(22) Filed: Sep. 12, 2008

(65) Prior Publication Data

US 2009/0073857 A1 Mar. 19, 2009

(30) Foreign Application Priority Data

Sep. 14, 2007 (JP) ................................. 2007-238932

(51) Int. Cl.
- *G11B 7/00* (2006.01)
- *G11B 7/135* (2012.01)
- *G02B 5/04* (2006.01)
- *G02B 7/18* (2006.01)

(52) U.S. Cl. ......... 369/112.28; 369/112.09; 369/112.14; 369/112.21; 359/831; 359/833; 359/834; 359/837

(58) Field of Classification Search .................. None
See application file for complete search history.

(56) References Cited

U.S. PATENT DOCUMENTS

| | | | | | |
|---|---|---|---|---|---|
| 5,864,525 | A | * | 1/1999 | Takeshita et al. | 369/44.23 |
| 2002/0181385 | A1 | * | 12/2002 | Kim et al. | 369/112.28 |
| 2007/0189145 | A1 | * | 8/2007 | Takasawa | 369/112.28 |

FOREIGN PATENT DOCUMENTS

JP 2000-113492 4/2000

* cited by examiner

*Primary Examiner* — Mohammad Ghayour
*Assistant Examiner* — Carl Adams
(74) *Attorney, Agent, or Firm* — Fish & Richardson P.C.

(57) ABSTRACT

An optical pickup apparatus comprising: a collimating lens configured to convert laser light emitted from a laser diode, from diffused light into parallel light; an objective lens; and a prism configured to guide the laser light emitted from the collimating lens to the objective lens, the prism including: a first face that the laser light emitted from the collimating lens enters; a second face that reflects the laser light entering the first face; and a third face that reflects the laser light reflected from the second face in a direction of the second face, and emits the laser light reflected again from the second face in a direction of the objective lens.

16 Claims, 3 Drawing Sheets

OPTICAL PICKUP APPARATUS

CROSS-REFERENCE TO RELATED APPLICATION

This application claims the benefit of priority to Japanese Patent Application No. 2007-238932, filed Sep. 14, 2007, of which full contents are incorporated herein by reference.

BACKGROUND OF THE INVENTION

1. Field of the Invention

The present invention relates to an optical pickup apparatus performing a reading-out operation of a signal recorded in an optical disc or a recording operation of a signal in the optical disc.

2. Description of the Related Art

There has been widespread optical disc apparatuses capable of a signal reading-out operation and signal recording operation by applying laser light emitted from an optical pickup apparatus to a signal recording layer of an optical disc.

FIG. 3 is a schematic diagram illustrating a general optical pickup apparatus used in an optical disc device. In this figure, reference numeral 1 denotes a laser diode emitting laser beam, which is red light with a wavelength of 650 nm, for example, and reference numeral 2 denotes a diffraction grating that the laser light emitted from the laser diode 1 enters and that includes a diffraction grating portion 2a for dividing the laser light into 0th order light, +1st order diffraction light and −1st order diffraction light and a half-wave plate 2b for converting the incident laser light to linear polarized light in an S direction.

Reference numeral 3 denotes a polarizing beam splitter that the laser light passing through the diffraction grating 2 enters and that includes a control film 3a reflecting S-polarized laser light and allowing the laser light polarized in a P direction to pass therethrough. Reference numeral 4 denotes a monitor photodetector provided at a position where the laser light having passed through the control film 3a included in the polarizing beam splitter 3 out of the laser light emitted from the laser diode 1 impinges on the photodetector, and detection output of the photodetector is used for controlling output of the laser light to be emitted from the laser diode 1.

Reference numeral 5 is a quarter-wave plate that is provided at a position where the laser light reflected at the control film 3a of the polarizing beam splitter 3 enters and that converts the incident laser light from linear polarized light into circular polarized light. Reference numeral 6 denotes a collimating lens that the diffused laser light having passed through the quarter-wave plate 5 enters, that converts the incident laser light into parallel light, and that corrects spherical aberration caused by a protective layer of an optical disc D.

Reference numeral 7 is a reflection mirror that the laser light having been converted into the parallel light by the collimating lens 6 impinges on and that reflects the laser light in a direction of a signal face of the optical disc D, and that return light reflected from a signal recording layer of the optical disc D impinges on and that reflects the return light in a direction of the polarizing beam splitter 3, as will be described later.

Reference numeral 8 is a sensor lens that the return light having passed through the control film 3a included in the polarizing beam splitter 3 enters, and includes a cylindrical face, a flat face, a concave face or a convex face and the like formed on the sides of the incident face and outgoing face. Such sensor lens 8 generates a focus error signal to be used for a focusing control operation by generating astigmatism in the return light.

Reference numeral 9 is a photodetector that is provided at a position where the return light having passed through the sensor lens 8 is focused and impinges thereon, and that is made up of a four-divided sensor and the like, in which photodiodes are arranged. The configuration of the photodetector 9 and the generation operation of the focus error signal by astigmatism method and the like are known and the description is omitted.

Reference numeral 10 is an objective lens that the laser light reflected by the reflection mirror 7 enters and that focuses the incident laser light to the signal recording layer included in the optical disc D. The objective lens 10 is fixed to a lens holder provided so as to be capable of a displacement operation in a direction perpendicular to the signal face of the optical disc, i.e., the focusing direction, as well as a radial direction of the optical disc, i.e., the tracking direction, by four support wires, for example. The configuration of such supporting mechanism of the lens holder and the like is known and the description is omitted.

In the case of performing a reproduction operation of a signal recorded in the optical disc D by using the optical pickup apparatus with the above configuration, a driving current is supplied to the laser diode 1, and laser light with a wavelength of 650 nm is emitted from the laser diode 1. The laser light emitted from the laser diode 1 enters the diffraction grating 2, where the laser light is divided by the diffraction grating portion 2a making up the diffraction grating 2 into the 0th order light, +1st order diffraction light, and −1st order diffraction light and converted by the half-wave plate 2b into the linear polarized light in the S direction. The laser light having passed through the diffraction grating 2 enters the polarizing beam splitter 3 and is reflected by the control film 3a included in the polarizing beam splitter 3, while a part of the laser light passes through the control film 3a to be applied to the monitor photodetector 4.

The laser light reflected by the control film 3a enters the collimating lens 6 through the quarter-wave plate 5, and is converted by the collimating lens 6 into the parallel light. The laser light converted by the collimating lens 6 into the parallel light is reflected by the reflection mirror 7, to enter the objective lens 10. The laser light incident on the objective lens 10 is applied to the signal recording layer of the optical disc D as a spot by a focusing operation of the objective lens 10. The laser light emitted from the laser diode 1 is applied as a desired spot to the signal recording layer of the optical disc D as described above, and in this case, the numerical aperture of the objective lens 10 is set at 0.6.

When the above-mentioned focusing operation of the laser light is performed by the objective lens 10, spherical aberration is generated due to a difference in thickness of the protective layer between the signal recording layer and the signal incident face of the optical disc D, however, adjustment can be made so as to minimize the spherical aberration by displacing the collimating lens 6, shown in an embodiment according to the present invention, in an optical path direction. Such an adjustment operation is commonly performed, and the description is omitted.

An irradiation operation of the laser light to the signal recording layer included in the optical disc D is performed by the above-mentioned operation, and when such an irradiation operation is performed, the return light reflected from the signal recording layer enters the objective lens 10 from the side of the optical disc D. The return light incident on the objective lens 10 enters the polarizing beam splitter 3 through the reflection mirror 7, collimating lens 6, and quarter-wave plate 5. Since the return light incident on the polarizing beam splitter 3 has been converted by the quarter-wave plate 5 into the linear polarized light in the P direction, thereby passing through the control film 3a provided in the polarizing beam splitter 3.

The return light of the laser light having passed through the control film 3a enters the sensor lens 8, and astigmatism is generated due to a function of the sensor lens 8. The return light in which the astigmatism has been generated due to the sensor lens 8 is applied to a sensor portion such as the four-divided sensor provided in the photodetector 9 by the focusing operation of the sensor lens 8. As the result of the irradiation of the return light to the photodetector 9 as above, a generating operation of a focus error signal is performed as known by using change in shape of a spot formed by irradiation on the sensor portion included in the photodetector 9. With use of such a focus error signal, the objective lens 10 is displaced in a direction of the signal face of the optical disc D, and thus, the focus control operation can be performed.

Although a description is omitted, a configuration is made so as to be able to perform a known tracking control operation with the use of the +1st order diffraction light and the −1st order diffraction light generated by the diffraction grating 2, and such a tracking control operation is performed to displace the objective lens 10 in the tracking direction, and thus, the reading-out operation of a signal recorded in the optical disc D is performed.

The reading-out operation of a signal recorded in the optical disc D is performed as mentioned above, and while the reading-out operation is performed, a part of the laser light is applied to the monitor photodetector 4, and a value of the driving current to be supplied to the laser diode 1 can be controlled by using change in level of a monitor signal obtained from the monitor photodetector 4.

Since the output of the laser light can be controlled by controlling the valued of the driving current to be supplied to the laser diode 1, the adjustment operation can be performed of the laser output required when performing not only the reproduction operation of a signal recorded in the optical disc D but also the recording operation of a signal in the optical disc D can be performed.

A general optical pickup apparatus is configured as shown in FIG. 3, and as obvious from the figure, a configuration is made such that the laser light converted by the collimating lens 6 into the parallel light is reflected in the direction of the objective lens 10 by the reflection mirror 7 and the reflection direction is at right angles to the parallel light.

An arrangement is made such that the optical axis of the objective lens 10 is perpendicular to the signal face of the optical disc D and the laser light converted by the collimating lens 6 into the parallel light is at right angles to the optical axis of the objective lens 10. As a result, a configuration is made such that a mounting angle of the reflection mirror 7 with respect to a base 11 is 45 degrees as shown in FIG. 3.

In FIG. 3, optical elements such as the polarizing beam splitter 3 and collimating lens 6 are illustrated differently in size and arrangement from those in practice for explanation's sake. That is, a configuration of an optical pickup apparatus in practice is made so as to arrange all the optical elements in a space portion between the base 11 and the optical disc D.

The thickness of the optical pickup apparatus, that is, the distance between the base 11 and the disc D is determined by the height of the reflection mirror 7, the distance between the reflection mirror 7 and the objective lens 10, the thickness of the objective lens 10, and the distance between the objective lens 10 and the optical disc D.

In optical pickup apparatuses with the same type of objective lenses, since the distance between the reflection mirror 7 and the objective lens 10 and the distance between the objective lens 10 and the optical disc D can not be reduced among the elements determining the thickness of the optical pickup apparatus, the height of the reflection mirror 7 is required to be reduced.

If the mounting angle of the reflection mirror 7 with respect to the base 11 is set at 45 degrees, the height of the reflection mirror 7 is required to be greater than the diameter of the laser light, and thus, the height of the reflection mirror 7 can not be reduced.

As a method for reducing the thickness of an optical pickup apparatus and solving such problem, there is proposed an art using a prism (See Japanese Patent Laid-Open Publication No. 2000-113492).

In the above-mentioned Japanese Patent Laid-Open Publication No. 2000-113492, there is described an optical pickup apparatus using a prism as means for changing a light path so that laser light having been converted by the collimating lens into parallel light is led in a direction of an objective lens.

According to such an art, the optical pickup apparatus can be reduced in thickness, however, the laser light is reflected only once on each reflection face provided in the prism to be led in the objective lens direction, so that further reduction of the thickness has not been possible.

SUMMARY OF THE INVENTION

An optical pickup apparatus according to an aspect of the present invention, comprises: a collimating lens configured to convert laser light emitted from a laser diode, from diffused light into parallel light; an objective lens; and a prism configured to guide the laser light emitted from the collimating lens to the objective lens, the prism including: a first face that the laser light emitted from the collimating lens enters; a second face that reflects the laser light entering the first face; and a third face that reflects the laser light reflected from the second face in a direction of the second face, and emits the laser light reflected again from the second face in a direction of the objective lens.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An optical pickup apparatus of an embodiment according to the present invention includes: a collimating lens that laser light emitted from a laser diode enters as diffused light that converts the laser light into parallel light; and a prism provided with an incident face that the laser light converted by the collimating lens into the parallel light enters, a reflection face that reflects the laser light entering the incident face, and a reflection-outgoing face that reflects the laser light reflected by the reflection face in a direction of the reflection face and that allows the laser light reflected again by the reflection face to go out in a direction of the objective lens. Since a configuration is made such that an outgoing direction of the laser light emitted from the reflection-outgoing face provided at the prism is perpendicular to the reflection face, that is, the light is reflected twice by the same reflection face, the thickness of the prism can be reduced. Therefore, according to an embodiment of the present invention, the optical pickup apparatus can be easily reduced in thickness.

In an optical pickup apparatus of an embodiment according to the present invention, since a configuration is made such that the laser light incident on the incident face of the prism is refracted in the reflection face direction, there is an advantage that the thickness of the prism as an optical component in a direction of the height thereof, that is, a direction of the optical axis of the objective lens, can be reduced, as compared with the case of a configuration in which the laser light enters perpendicularly to the incident face of the prism. Therefore, the optical pickup apparatus can be reduced in thickness according to an embodiment of the present invention.

Figure 1:
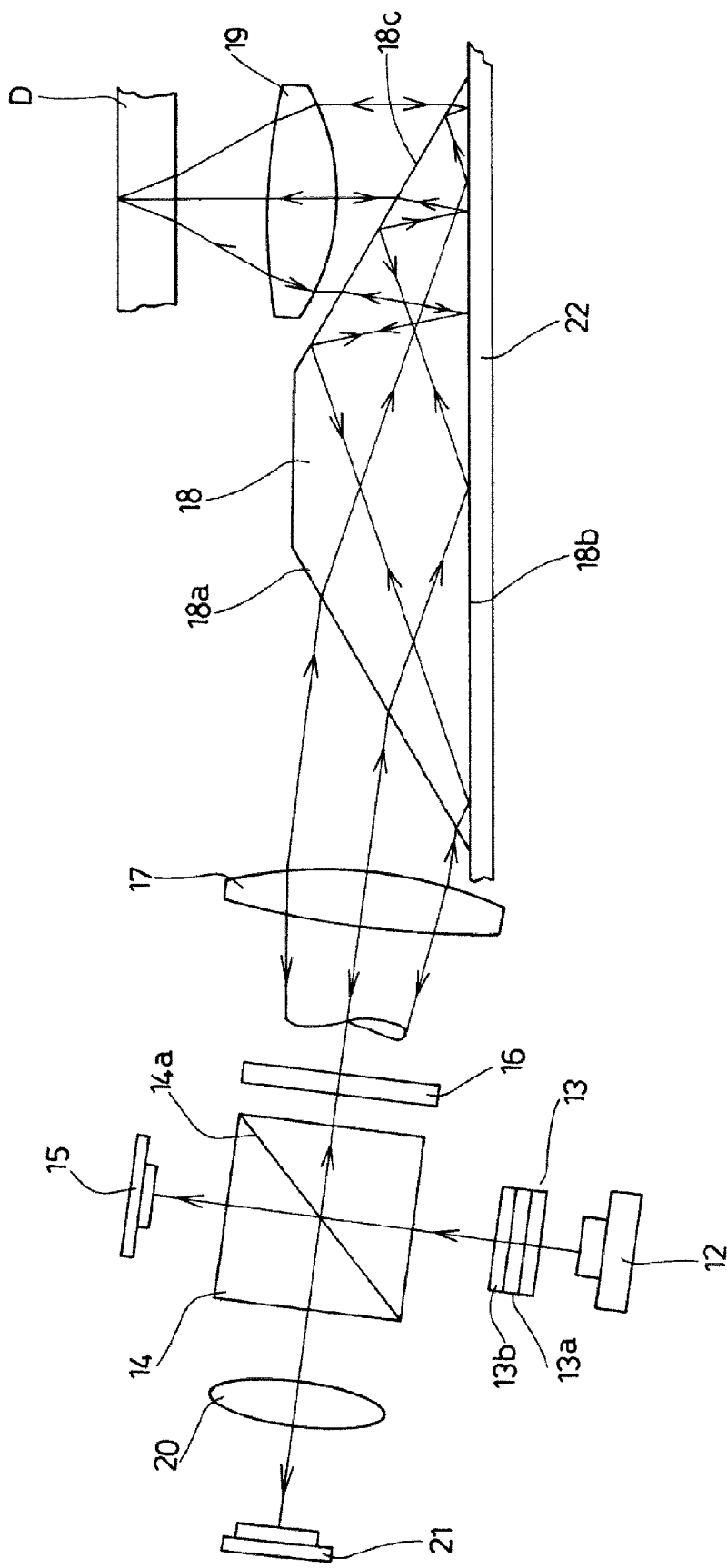
FIG. 1 is a schematic diagram illustrating an optical pickup apparatus according to an embodiment of the present invention.

In FIG. 1, reference numeral 12 denotes a laser diode emitting laser light, which is red light with a wavelength of 650 nm, for example, and reference numeral 13 denotes a diffraction grating that the laser light emitted from the laser diode 12 enters and that includes a diffraction grating portion 13a for dividing the laser light into 0th order light, +1st order diffraction light and −1st order diffraction light and a half-wave plate 13b for converting the incident laser light into linear polarized light in an S direction.

Reference numeral 14 denotes a polarizing beam splitter that the laser light having passed through the diffraction grating 13 enters and that includes a control film 14a for reflecting S-polarized laser light and allowing the laser light polarized in a P direction to pass therethrough. Reference numeral 15 denotes a monitor photodetector provided at a position where the laser light having passed through the control film 14a provided in the polarizing beam splitter 14 out of the laser light emitted from the laser diode 12 impinges on the photodetector, and detection output of the photodetector is used for controlling output of the laser light to be emitted from the laser diode 12.

Reference numeral 16 is a quarter-wave plate that is provided at a position where the laser light reflected by the control film 14a of the polarizing beam splitter 14 enters and that converts the incident laser light from linear polarized light into circular polarized light. Reference numeral 17 denotes a collimating lens that the diffused laser light having passed through the quarter-wave plate 16 enters, that converts the incident laser light to parallel light, and that corrects spherical aberration caused by a protective layer of an optical disc D.

Reference numeral 18 denotes a prism provided with an incident face 18a (first face)that the laser light converted by the collimating lens 17 into parallel light enters, a reflection face 18b (second face) that the laser light refracted by the incident face 18a is applied to and that reflects the laser light, and a reflection-outgoing face 18c (third face) that the laser light reflected by the reflection face 18b is applied to, that reflects the laser light in a direction of the reflection face 18b, that the laser light reflected again by the reflection face 18b is applied to, and that allows the laser light applied as above to go out. As a glass material thereof, BK7 glass is used, for example. The incident face 18a and the reflection face 18b are connected with each other, and the reflection face 18b and the reflection-outgoing face 18c also are connected with each other.

The reflection face 18b of the prism is fixed to a bottom plate of the optical pickup apparatus so as to be in parallel with a signal face of the optical disc, which is arranged to face the objective lens such that a signal is recorded or reproduced.

The prism having the above configuration is made up such that the laser light emitted from the reflection-outgoing face 18c is changed in direction to be emitted in the same direction as a direction of the optical axis of an objective lens 19.

Also, the prism 18 is provided to serve a function that the return light reflected from the signal recording layer of the optical disc D enters through the objective lens 19, and that allows the return light to go out in a direction of the polarizing beam splitter 14.

Reference numeral 20 is a sensor lens that the return light having passed through the control film 14a provided in the polarizing beam splitter 14 enters and has a cylindrical face, a flat face, a concave face or a convex face and the like formed on the sides of an incident face and outgoing face. Such sensor lens 20 generates a focus error signal to be used for a focusing control operation by generating astigmatism in the return light.

Reference numeral 21 is a photodetector that is provided at a position where the return light having passed through the sensor lens 20 is focused to be applied thereto and that is made up of a four-divided sensor and the like, in which photodiodes are arranged.

The objective lens 19, as known, is fixed to a lens holder provided so as to be capable of a displacement operation in a direction perpendicular to the signal face of the optical disc D, i.e., the focusing direction as well as a radial direction of the optical disc D, i.e., the tracking direction, by four support wires, for example. A configuration is made such that the optical axis of the objective lens 19 fixed to the lens holder is perpendicular to the signal face of the optical disc D.

In the case of performing a reproduction operation of a signal recorded in the optical disc D by using the optical pickup apparatus having the above configuration, a driving current is supplied to the laser diode 12, and laser light with a wavelength of 650 nm is emitted from the laser diode 12. The laser light emitted from the laser diode 12 enters the diffraction grating 13, where the laser light is divided by the diffraction grating portion 13a making up the diffraction grating 13 into the 0th order light, +1st order diffraction light, and −1st order diffraction light and converted by the half-wave plate 13b into the linear polarized light in the S direction. The laser light having passed through the diffraction grating 13 enters the polarizing beam splitter 14 and is reflected by the control film 14a provided in the polarizing beam splitter 14, while a part of the laser light passes through the control film 14a to be applied to the monitor photodetector 15.

The laser light reflected by the control film 14a enters the collimating lens 17 through the quarter-wave plate 16 and is converted by the collimating lens 17 into the parallel light. The laser light converted by the collimating lens 17 into the parallel light is applied to the incident face 18a included in the prism 18.

The laser light applied to the incident face 18a of the prism 18 is changed in light path angle by a refraction action by the incident face 18a to be applied to the reflection face 18b. The laser light applied to the reflection face 18b is reflected by the reflection face 18b and its light path direction is changed as shown.

The laser light reflected by the reflection face 18b is applied to the reflection-outgoing face 18c formed on the prism 18 and reflected by the reflection-outgoing face 18c in a direction of the reflection face 18b. When the laser light reflected by the reflection-outgoing face 18c is applied to the reflection face 18b as above, the laser light is reflected by the reflection face 18b again.

The laser light reflected again by the reflection face 18b is applied to the reflection-outgoing face 18c, however, a configuration is made such that an incident angle relative to the reflection-outgoing face 18c in this case becomes large.

As a result, the laser light applied to the reflection-outgoing face 18c is not reflected but emitted to the outside through the reflection-outgoing face 18c. The laser light emitted to the outside from the reflection-outgoing face 18c is refracted and changed in its outgoing direction, and a configuration is made such that the direction is the same as the direction of the optical axis of the objective lens 19.

The laser light emitted to the outside through the reflection-outgoing face 18c of the prism 18 enters the objective lens 19. The laser light incident on the objective lens 19 as above is applied as a spot to the signal recording layer of the optical disc D by the focusing operation of the objective lens 19. In this way, the laser light emitted from the laser diode 12 is applied as a desired spot to the signal recording layer of the optical disc D, and in this case, the numerical aperture of the objective lens 19 is set at 0.6.

An irradiation operation of the laser light to the signal recording layer provided in the optical disc D is performed by the above-mentioned operation, and when such an irradiation operation is performed, the return light reflected from the signal recording layer enters the objective lens 19 from the side of the optical disc D. The return light incident on the objective lens 19 enters the polarizing beam splitter 14 through the prism 18, collimating lens 17, and quarter-wave plate 16. Since the return light incident on the polarizing beam splitter 14 has been converted by the quarter-wave plate 16 into the linear polarized light in the P direction, thereby passing through the control film 14a provided in the polarizing beam splitter 14.

The return light of the laser light having passed through the control film 14a enters the sensor lens 20, and astigmatism is generated due to a function of the sensor lens 20. The return light in which the astigmatism has been generated due to the sensor lens 20 is applied to a sensor portion such as a four-divided sensor provided in the photodetector 21 by the focusing operation of the sensor lens 20. As the result of the irradiation of the return light to the photodetector 21 as above, a generating operation of a focus error signal is performed as known by using change in shape of a spot formed by irradiation on the sensor portion included in the photodetector 21. Thus, with use of such a focus error signal, the objective lens 19 is displaced in a direction perpendicular to the signal face of the optical disc D, and therefore, the focus control operation can be performed.

Although a description is omitted in an embodiment of the present invention, a configuration is made so as to be able to perform a known tracking control operation with the use of the +1st order diffraction light and the −1st order diffraction light generated by the diffraction grating 13, such a tracking control operation is performed to displace the objective lens 19 in the tracking direction, and thus, the reading-out operation of a signal recorded in the optical disc D can be performed.

The reading-out operation of a signal recorded in the optical disc D is performed as mentioned above, and while the reading-out operation is performed, a part of the laser light is applied to the monitor photodetector 15, and a value of the driving current to be supplied to the laser diode 12 can be controlled by using change in level of a monitor signal obtained from the monitor photodetector 15.

Since the output of the laser light can be controlled by controlling the value of the driving current supplied to the laser diode 12, an adjustment operation can be performing not only the reproduction operation of a signal recorded in the optical disc D but also the recording operation a signal in the optical disc D can be performed.

An optical pickup apparatus according to an embodiment of the present invention is configured as shown in FIG. 1, and in the figure, optical elements such as the polarizing beam splitter 14 and collimating lens 17 are illustrated differently in size and arrangement from those in practice for explanation's sake. That is, a configuration of an optical pickup apparatus in practice is made so as to arrange all the optical elements in a space portion between a base, i.e., a bottom plate 22 of the optical pickup apparatus and the optical disc D.

Laser light L1 incident on the incident face 18a of the prism 18 is refracted by the incident face 18a to be applied in the direction of the reflection face 18b as laser light L2. Such laser light L2 is reflected by the reflection face 18b to be applied in the direction of the reflection-outgoing face 18c as laser light L3.

The laser light L3 reflected by the reflection face 18b to be applied to the reflection-outgoing face 18c is reflected by the reflection-outgoing face 18c to be applied in the direction of the reflection face 18b as laser light L4. The laser light L4 applied to the reflection face 18b is reflected again by the reflection face 18b and applied in the direction of the reflection-outgoing face 18c as laser light L5.

In this way, since a configuration is made such that an incident angle of the laser light L5 applied to the reflection-outgoing face 18c relative to the reflection-outgoing face 18c becomes larger as shown, the laser light L5 applied to the reflection-outgoing face 18c is emitted to the outside as laser light L6 without being reflected.

Figure 2:
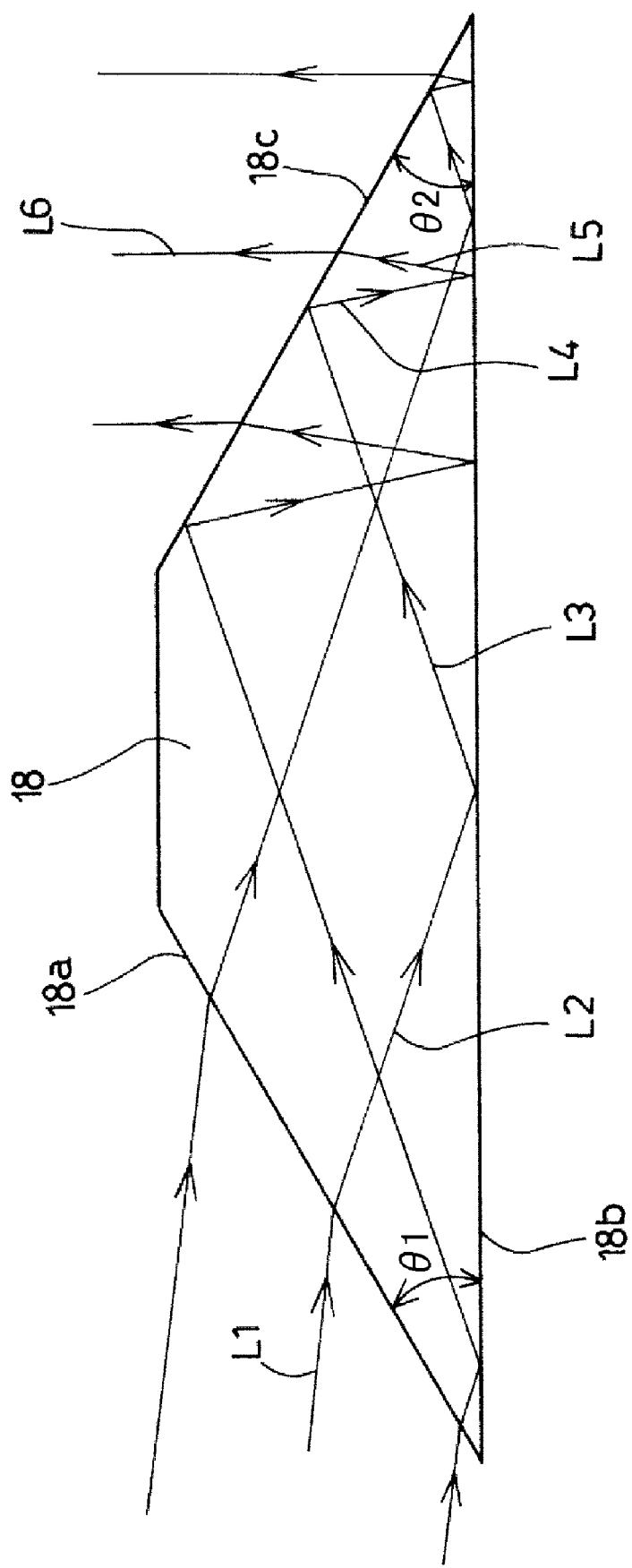
FIG. 2 is an enlarged view of a prism according to an optical pickup apparatus according to an embodiment of the present invention.
Figure 3:
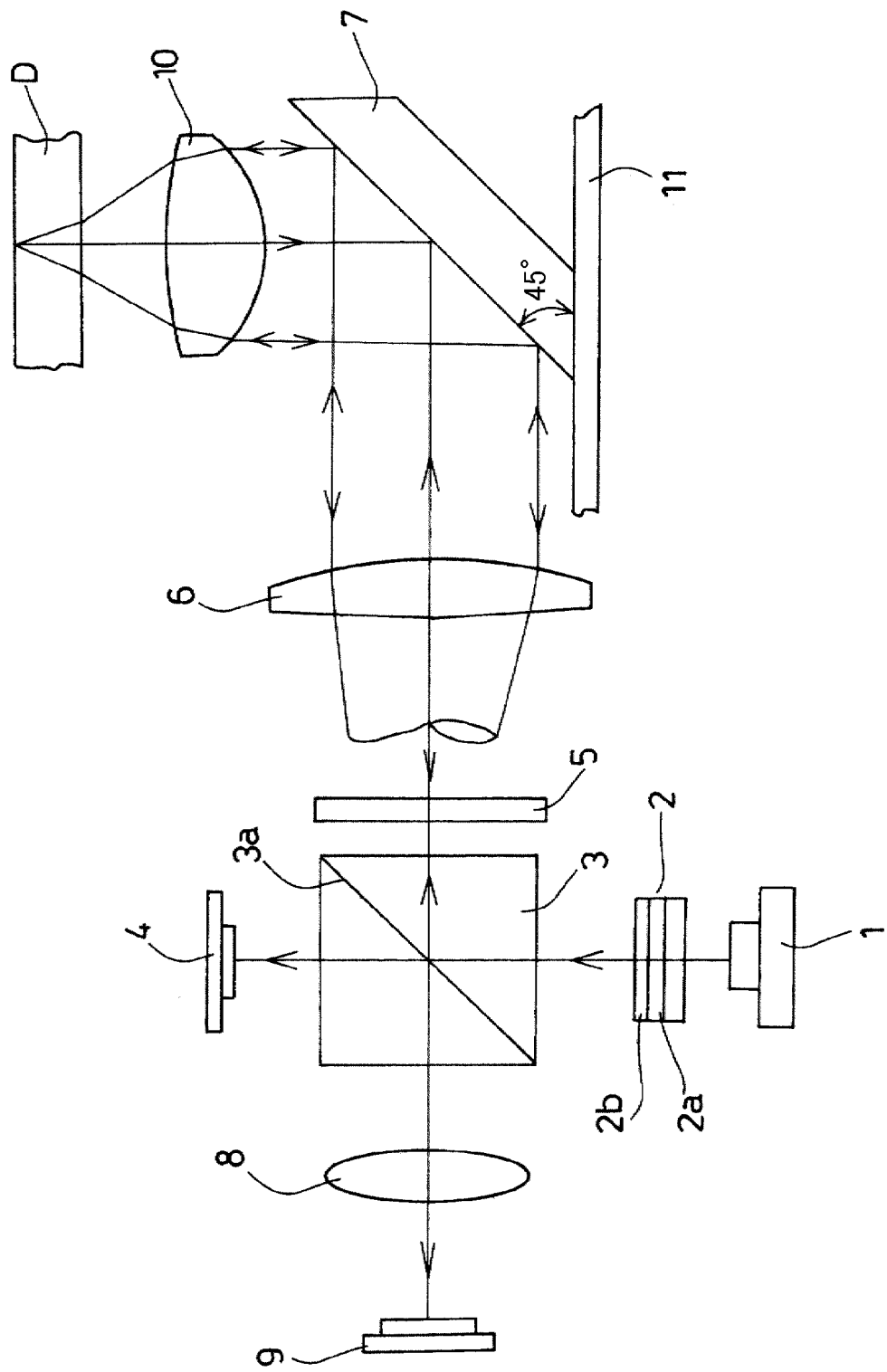
FIG. 3 is a schematic diagram illustrating an optical pickup apparatus.

Since the prism 18 according to an embodiment of the present invention as above causes reflection twice at the reflection face 18b, the thickness of the prism 18 in the direction of the optical axis of the objective lens, that is, a length in the vertical direction in FIG. 2 can be reduced.

It can become possible to perform each operation of incidence, refraction, reflection and transmission for each face by setting the incident angle of the laser light to be applied to the incident face 18a, reflection face 18b, and reflection-outgoing face 18c provided at the prism 18 according to a refractive index of the prism 18 and a wavelength of the laser light.

In FIG. 2, if an interior angle between the incident face 18a and the reflection face 18b formed on the prism 18 is assumed to be θ1 and the interior angle between the reflection-outgoing face 18c and the reflection face 18b is assumed to be θ2, θ1 and θ2 are set to be about 30 degrees. In an embodiment according to the present invention, a configuration is made such that θ1=θ2, and according to such a configuration, since the prism 18 is symmetrical as shown, not only the manufacture of the prism 18 becomes simple, but also the optical pickup apparatus can be easily assembled easily, which are advantages.

In an embodiment of the present invention, the laser diode emitting the laser light with a wavelength of 650 nm is used as the laser diode 12, however, it is needless to say that an optical pickup apparatus can be put into practice using a laser diode emitting laser light with other wavelength. Also, BK7 glass is used as a glass material of the prism 18, but other glass materials can also be used.

In an embodiment of the present invention, the laser light converted into the parallel light by the collimating lens 17 enters the incident face 18a of the prism 18 as it is, but there can be provided a member changing an irradiation direction of the laser light such as the diffraction grating, triangle prism and the like in the light path between the collimating lens 17 and the incident face 18a of the prism 18. That is, according to such a configuration, since the laser light emitted from the collimating lens 17 can be made parallel with the reflection face 18b of the prism 18, the thickness of the optical pickup apparatus can be reduced.

Also, in an embodiment of the present invention, the description is made for the case where an angle of the laser light L1 incident on the incident face 18a of the prism 18 relative to the reflection face 18b is larger than 0 degrees, however, the angle of the laser light L1 relative to the reflection face 18b can be 0 degrees, that is, the laser light L1 may be made parallel with the reflection face 18b of the prism 18. In such a case, if the prism 18 is made from a glass material having a refractive index of 1.52, the prism can be put into practice with the above θ1 of 41.05 degrees and θ2 of 30 degrees.

The prism of an embodiment of the present invention has allows the laser light to be reflected twice by the reflection face 18b. When comparing the prism with two reflections to a prism with one reflection as in the prior art as to a magnification of the prism, i.e., a ratio between a diameter of laser light incident on an incident face and a diameter of the laser light emitted from an outgoing face, there is a characteristic that the magnification of the prism with two reflections is greater.

Therefore, if the diameter of the laser light L6 incident on the objective lens is the same between an embodiment of the present invention and the prior art, the diameter of the laser light L1 incident on the incident face 18a of the prism 18 in the embodiment of the present invention can be smaller than that in the prior art. As mentioned above, according to an embodiment of the present invention, the diameter of the laser light L1 incident to the incident face 18a of the prism 18 can be made smaller, and thus, there is an advantage that the optical system arranged between the prism 18 and the laser diode 12 can be reduced in thickness.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
    a collimating lens configured to convert laser light emitted from a laser diode, from diffused light into parallel light;
    an objective lens; and
    a prism configured to guide the laser light emitted from the collimating lens to the objective lens, the prism including:
        a first face that the laser light emitted from the collimating lens enters;
        a second face that reflects the laser light entering the first face; and
        a third face that reflects the laser light reflected from the second face in a direction of the second face, and emits the laser light reflected again from the second face in a direction of the objective lens,
    wherein:
        the second face comprises a planar surface in parallel with a signal face of an optical disc, the signal face of the optical disc being positioned to face the objective lens to allow a signal to be recorded or reproduced,
        the first face is adjacent to, shares an edge with, and is disposed at a positive interior first angle with respect to the second face, and
        the third face is adjacent to, shares an edge with, and is disposed at a positive interior second angle with respect to the second face.

2. The optical pickup apparatus according to claim 1, wherein a direction of the laser light emitted from the third face is perpendicular to the second face.

3. The optical pickup apparatus according to claim 2, wherein a direction of the laser light emitted from the third face is the same as a direction of an optical axis of the objective lens.

4. The optical pickup apparatus according to claim 3, wherein the second face is fixed to a bottom plate of the optical pickup apparatus.

5. The optical pickup apparatus according to claim 1, wherein the laser light entering the first face is refracted in a direction of the second face.

6. The optical pickup apparatus according to claim 1, wherein
    the first face and the second face are connected with each other;
    the second face and the third face are connected with each other; and
    the positive interior first angle and the positive interior second angle are substantially the same.

7. The optical pickup apparatus according to claim 1, wherein the positive interior first angle is different from the positive interior second angle.

8. The optical pickup apparatus according to claim 1, wherein:
    after reflecting the laser light entering the first face, the second face reflects the laser light reflected from the third face, in a direction of the third face.

9. The optical pickup apparatus according to claim 8, wherein the laser light emitted by the third face, and reflected again from the second face in a direction towards the objective lens, is perpendicular to the second face.

10. The optical pickup apparatus according to claim 1, wherein:
    the laser light emitted from the collimating lens and entering the first face is parallel to the second face, and
    the first face refracts the laser light in the direction of the second face.

11. The optical pickup apparatus according to claim 10, wherein the laser light entering the first face enters at an angle with respect to the first face that is less than 90 degrees.

12. An optical pickup apparatus comprising:
    a collimating lens configured to convert laser light emitted from a laser diode, from diffused light into parallel light;
    an objective lens; and
    a prism configured to guide the laser light emitted from the collimating lens to the objective lens, the prism including an incident face, a reflection face, and a reflection-outgoing face wherein:
        the laser light emitted from the collimating lens enters the incident face and is directed towards the reflection face, the reflection face then directing the laser light towards the reflection-outgoing face, the reflection-outgoing face then directing the laser light towards the reflection face, the reflection face then directing the laser light towards the reflection-outgoing face, and the reflection-outgoing face then passing the laser light through towards the objective lens.

13. The optical pickup apparatus of claim 12, wherein the reflection-outgoing face directs the laser light toward the reflection face based on a first incident angle of the laser light relative to the reflection-outgoing face.

14. The optical pickup apparatus of claim 13, wherein the reflection-outgoing face passes the laser light through toward the objective lens based on a second, different angle of the laser light relative to the reflection-outgoing face.

15. The optical pickup apparatus of claim 14, wherein the second angle is not equal to the first incident angle.

16. The optical pickup apparatus of claim 14, wherein the first and second incident angles are determined based on a refractive index of the prism and a wavelength of the laser light.

* * * * *